United States Patent [19]
Shibata

[11] Patent Number: 5,631,775
[45] Date of Patent: May 20, 1997

[54] ZOOM LENS SYSTEM

[75] Inventor: Hironori Shibata, Hachioji, Japan

[73] Assignee: Olympus Optical Co., Ltd., Tokyo, Japan

[21] Appl. No.: 341,908

[22] Filed: Nov. 15, 1994

[30] Foreign Application Priority Data

Nov. 16, 1993 [JP] Japan ................... 5-308574

[51] Int. Cl.$^6$ ................................. G02B 15/14
[52] U.S. Cl. .................... 359/683; 359/684; 359/686; 359/689
[58] Field of Search ................... 359/684, 689, 359/691, 682, 681, 686, 683

[56] References Cited

U.S. PATENT DOCUMENTS

| | | | |
|---|---|---|---|
| 4,099,846 | 7/1978 | Kawamura et al. | 359/684 |
| 4,266,860 | 5/1981 | Hayashi | 359/684 |
| 4,447,135 | 5/1984 | Nakamura | 359/684 |
| 4,775,228 | 10/1988 | Ikemori et al. | 359/691 |
| 5,175,648 | 12/1992 | Mori | 359/689 |
| 5,221,994 | 6/1993 | Nishio | 359/684 |
| 5,329,401 | 7/1994 | Sato | 359/684 |

FOREIGN PATENT DOCUMENTS

| | | |
|---|---|---|
| 52-84754 | 7/1977 | Japan. |
| 52-41068 | 10/1977 | Japan. |
| 59-208519 | 11/1984 | Japan. |
| 62-153913 | 7/1987 | Japan. |
| 62-153914 | 7/1987 | Japan. |

*Primary Examiner*—Georgia Y. Epps
*Assistant Examiner*—Jordan M. Schwartz
*Attorney, Agent, or Firm*—Cushman, Darby & Cushman IP Group of Pillsbury Madison & Sutro LLP

[57] ABSTRACT

A zoom lens system comprising, in order from the object side, a first lens unit having a negative refractive power, a second lens unit having a positive refractive power, a third lens unit having a negative refractive power, a stop, a fourth lens unit having a positive refractive power and a fifth lens unit having a positive refractive power; and configured to be zoomed from a wide position to a tele position thereof by moving the second lens unit and the third lens unit so as to widen an airspace reserved therebetween, and moving the third lens unit and the fourth lens unit so as to narrow an airspace reserved therebetween with the first lens unit kept stationary. This zoom lens system has a field angle of 75° at the wide position, a vari-focal ratio as high as 8, a compact size and high imaging performance.

6 Claims, 16 Drawing Sheets

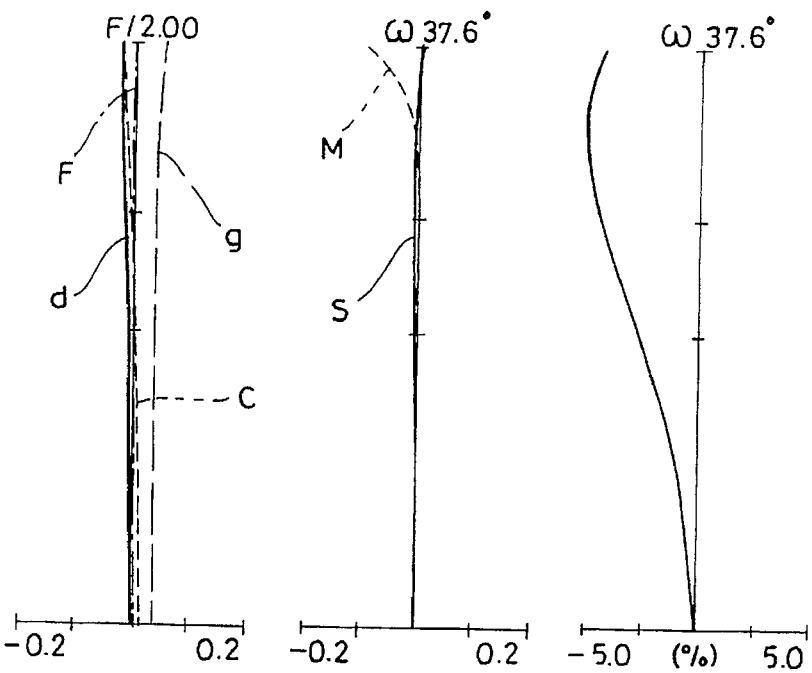
FIG. 5A SPHERICAL ABERRATION
FIG. 5B ASTIGMATISM
FIG. 5C DISTORTION
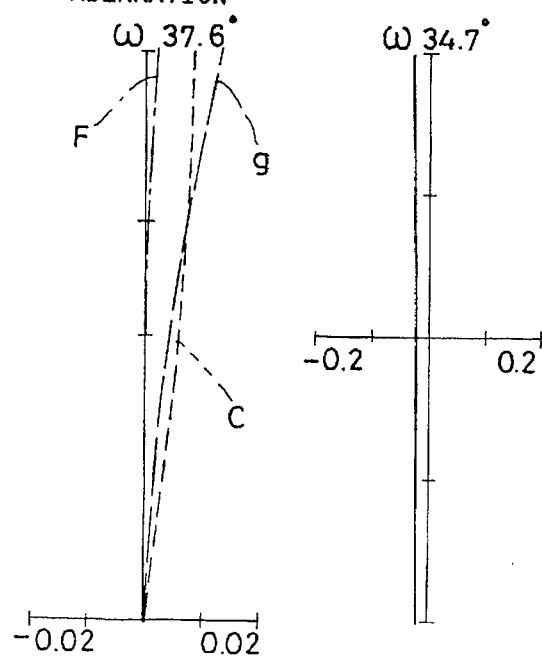
FIG. 5D LATERAL CHROMATIC ABERRATION
FIG. 5E COMA

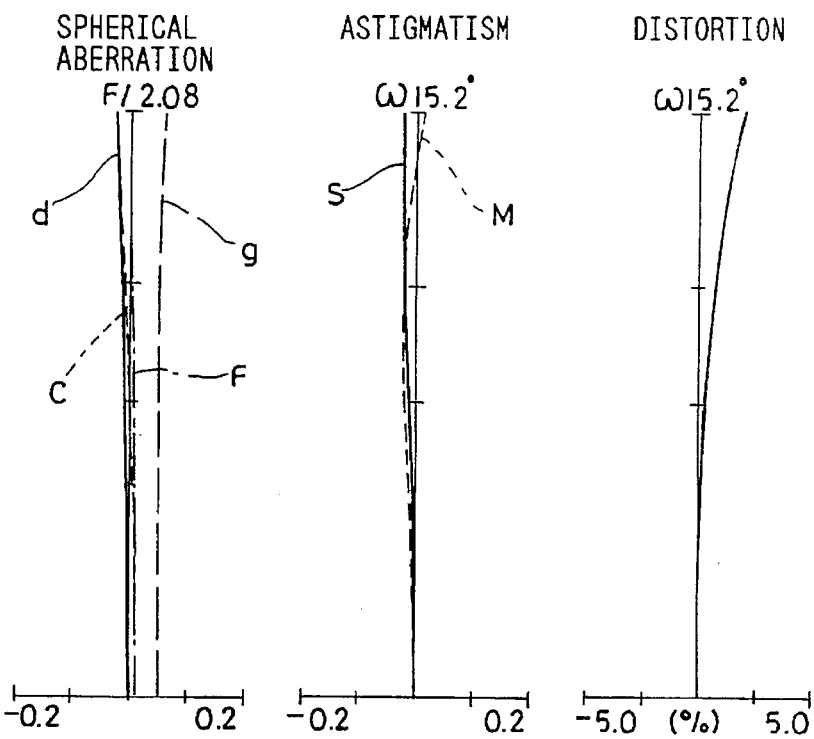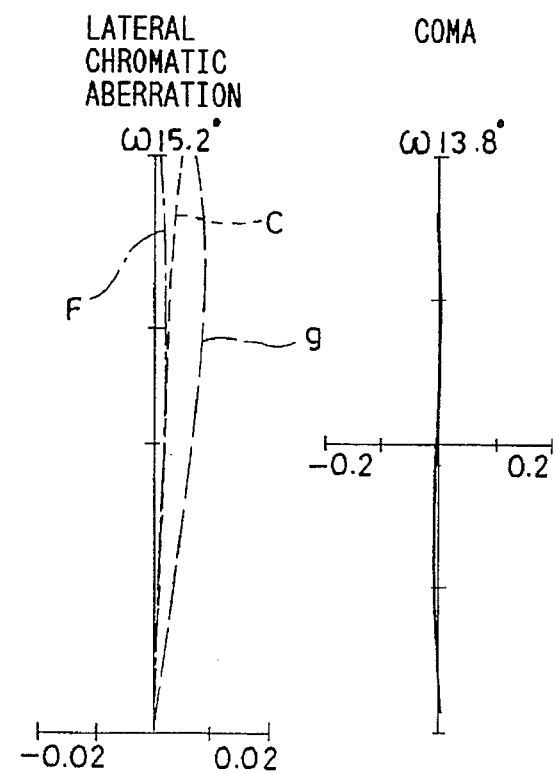

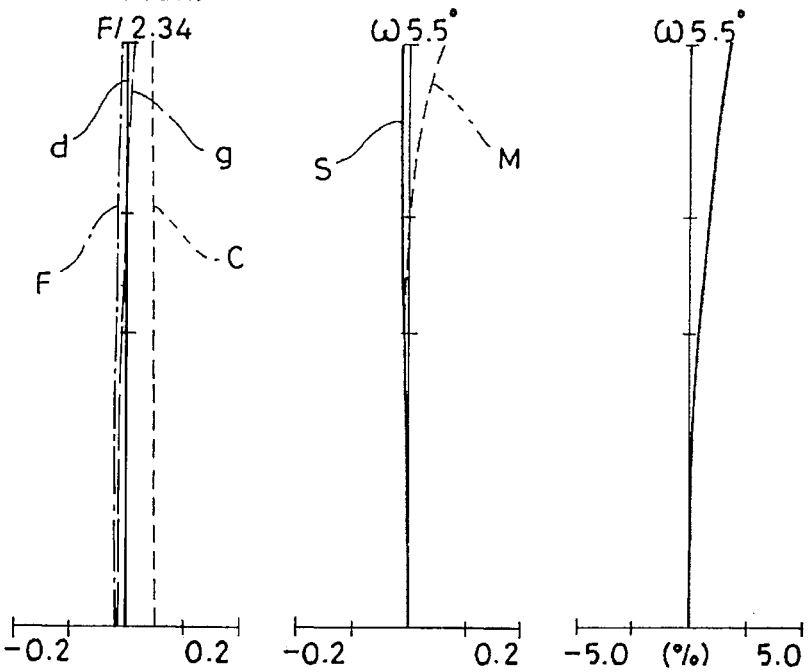

SPHERICAL ABERRATION
NA 0.0012

ASTIGMATISM

ω 37.6°

DISTORTION
ω 37.6°

LATERAL CHROMATIC ABERRATION
ω 37.6°

COMA
ω 34.7°

SPHERICAL ABERRATION

ASTIGMATISM

DISTORTION

LATERAL CHROMATIC ABERRATION

COMA

FIG. 10A
SPHERICAL ABERRATION
NA 0.0084

FIG. 10B
ASTIGMATISM
ω 5.5°

FIG. 10C
DISTORTION
ω 5.5°

FIG. 10D
LATERAL CHROMATIC ABERRATION
ω 5.5°

FIG. 10E
COMA
ω 4.9°

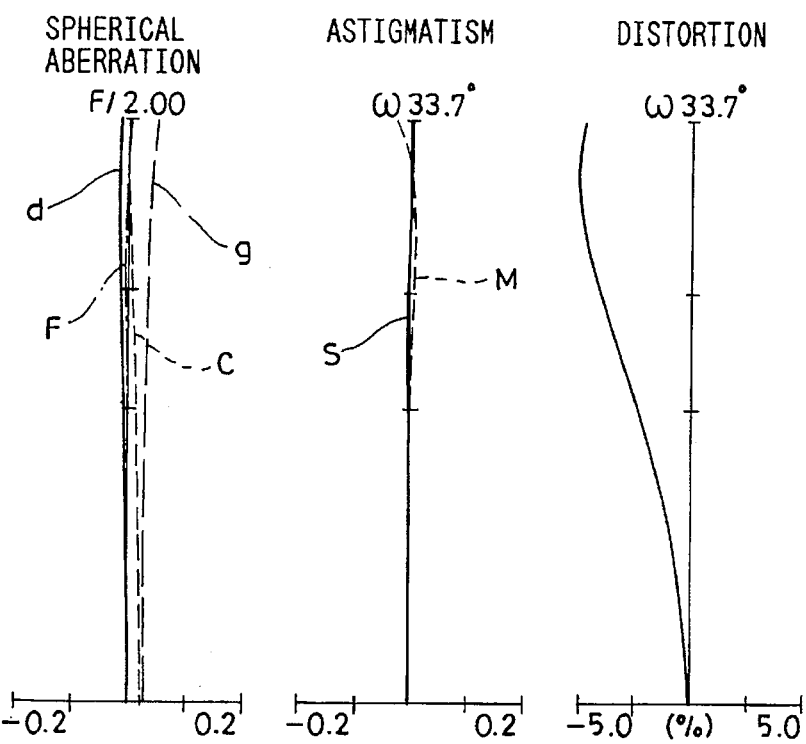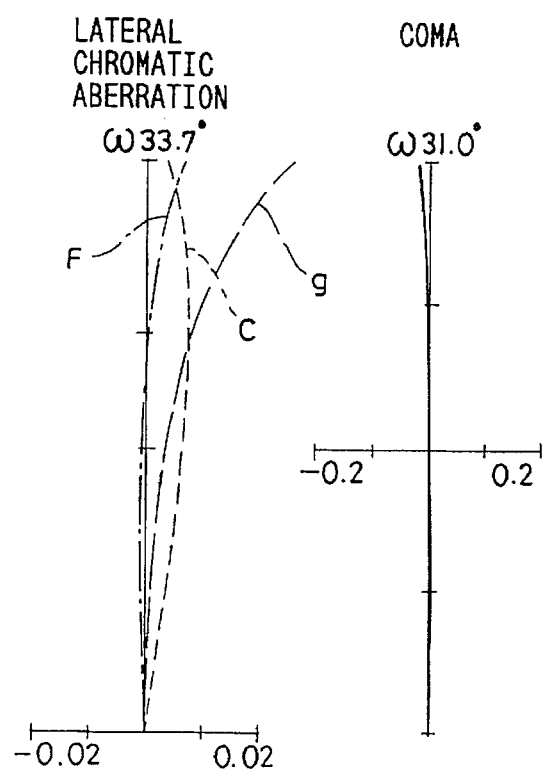

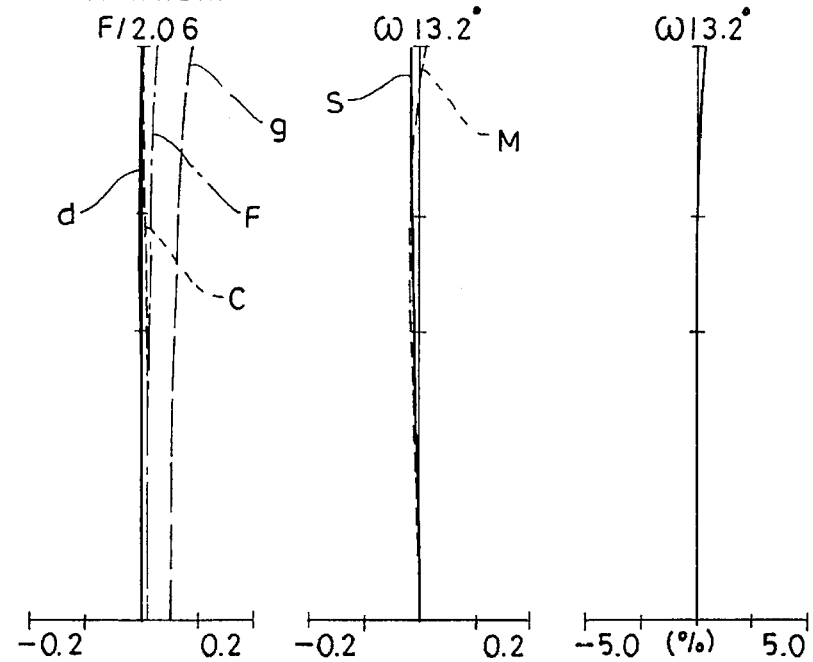
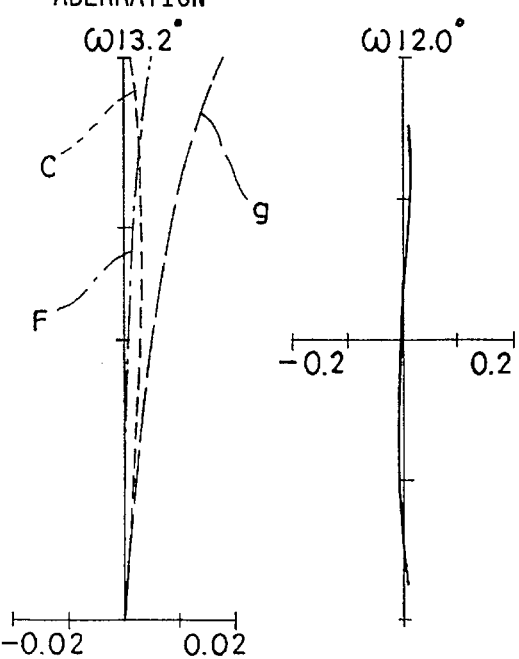

FIG. 13A
SPHERICAL ABERRATION
FIG. 13B
ASTIGMATISM
FIG. 13C
DISTORTION
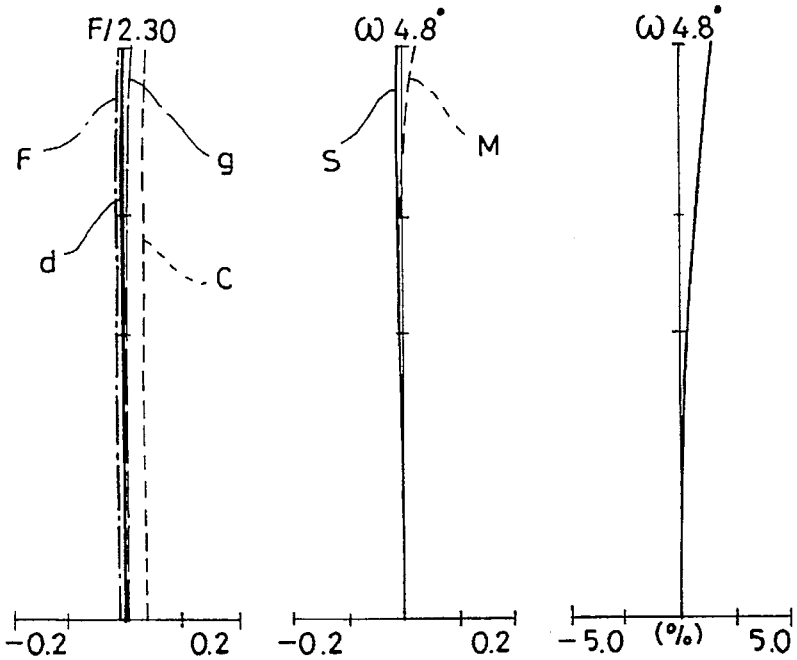
FIG. 13D
LATERAL CHROMATIC ABERRATION
FIG. 13E
COMA
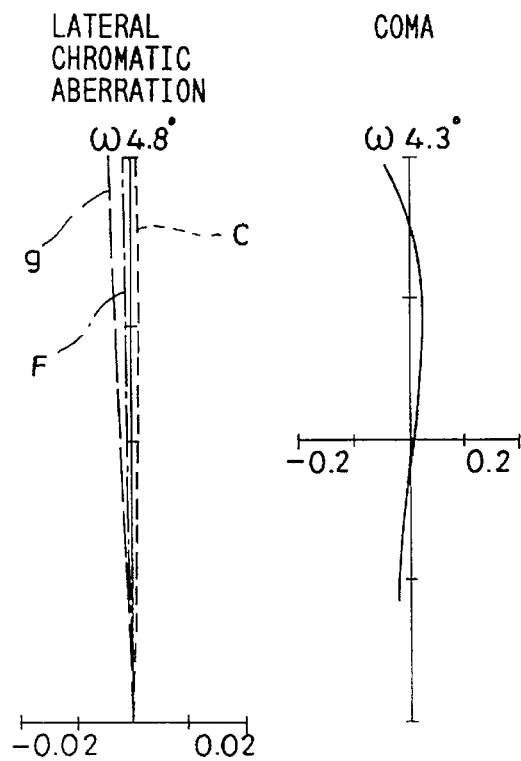

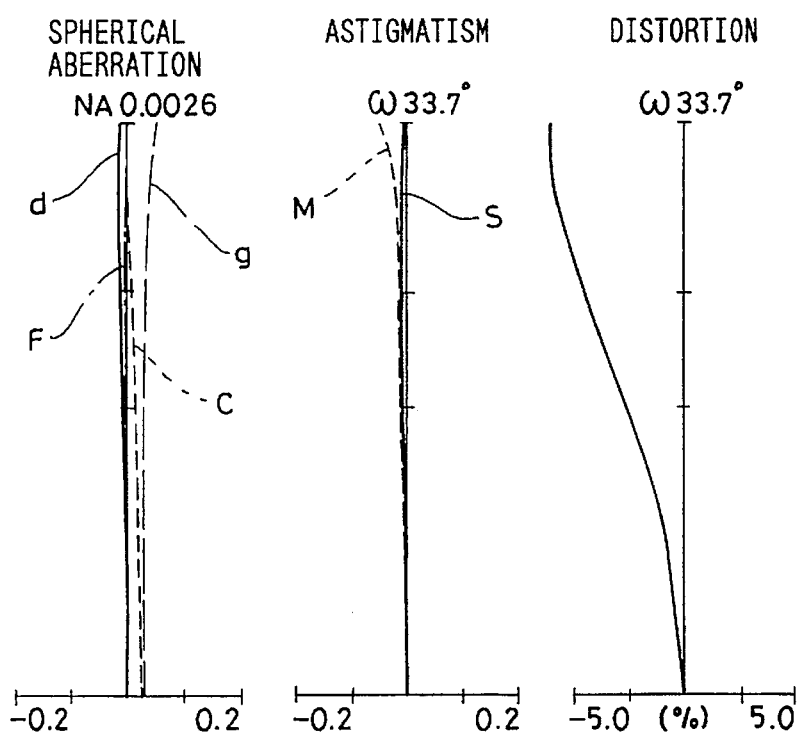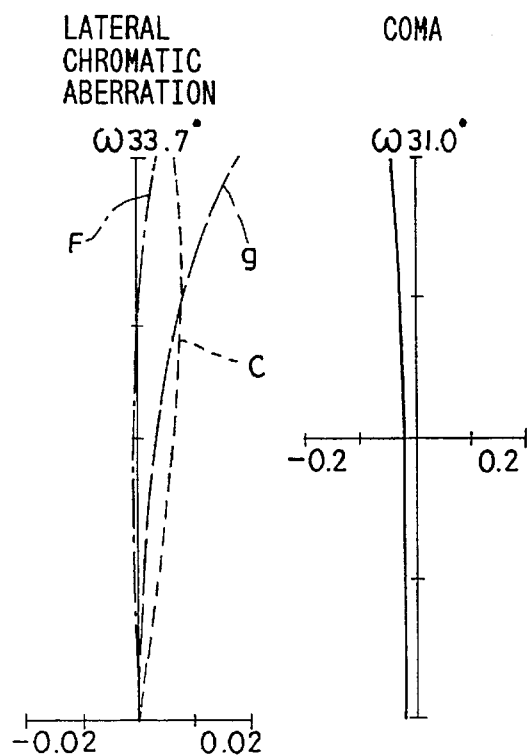

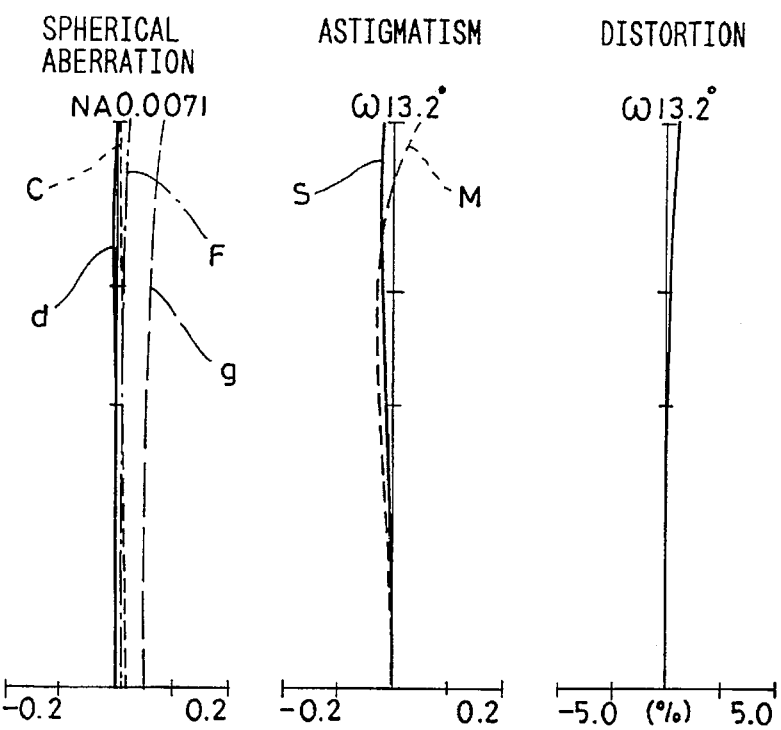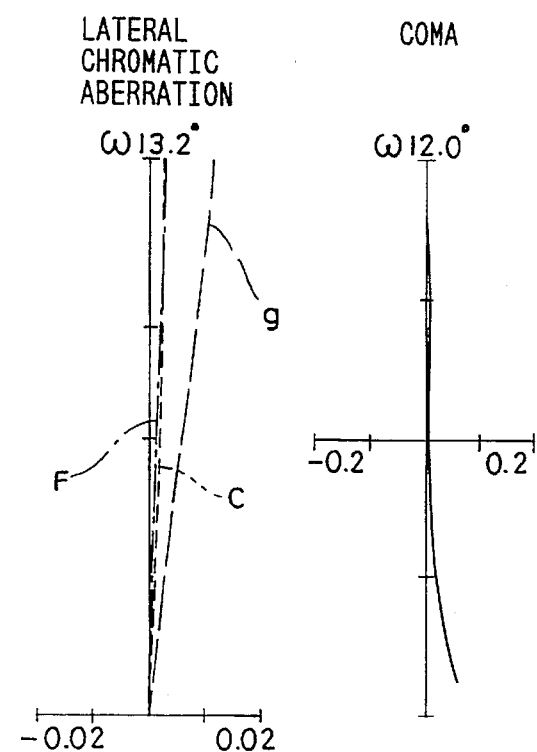

SPHERICAL ABERRATION
NA 0.0181

ASTIGMATISM
ω 4.8°

DISTORTION
ω 4.8°

LATERAL CHROMATIC ABERRATION
ω 4.8°

COMA
ω 4.3°

ZOOM LENS SYSTEM

BACKGROUND OF THE INVENTION a) Field of the Invention

The present invention relates to a zoom lens system which is to be used with video cameras or the similar instruments employing solid-state image pickup or equivalent devices.

b) Description of the Prior Art

In general zoom lens systems which have wide field angles have offaxial rays which are incident at a high point on front lens components of these zoom lens systems, and the front lens components have large diameters, whereby lens units disposed on the object side in the zoom lens systems have negative refractive powers in most cases. Further, each of conventional zoom lens systems comprise four or more lens units in order to obtain a high vari-focal ratio.

Examples of these conventional zoom lens systems are the lens systems disclosed by Japanese Patents Kokai Publication No. Sho 59-208,519, Kokai Publication No. Sho 62-153,913 and so on.

Further, a general method for focusing the zoom lens systems of this type is to move a front lens units disposed therein. In the zoom lens systems disclosed by Japanese Patents Kokai Publication No. Sho 52-84,754, etc., the front lens unit is divided into units are divided to subunits and only certain of the subunits are moved for focusing the zoom lens systems. In this way the weight of the lens units which are movable for focusing the zoom lens systems are reduced.

The conventional zoom lens systems mentioned above hardly allows any reduction in the diameters of the front lens components to be used therein and cannot provide high quality images over the entire zooming range thereof due to an improper selections of loci for moving the lens units for zooming and an inadequate refractive power distribution in the zoom lens systems.

Furthermore, the zoom lens system disclosed by Japanese Patent Kokai Publication No. Sho 52-84,754 is not sufficiently compact and the imaging performance thereof for photographing objects located at short distances is due to an improper focusing method or an inadequate composition of the focusing lens unit and improper shapes of the focusing lens elements.

SUMMARY OF THE INVENTION

A primary object of the present invention is to provide a compact zoom lens system which has a field angle as wide as 75° at a wide position thereof, a high vari-focal ratio on the order of 8, a favorable imaging performance over an entire zooming range thereof and within a range from infinite distance to a short distance.

The zoom lens system according to the present invention comprises, in order from the object side, a first lens unit having a negative refractive power, a second lens unit having a positive refractive power, a third lens unit having a negative refractive power, a stop, a fourth lens unit having a positive refractive power and a fifth lens unit having a positive refractive power. The zoom lens system according to the present invention is characterized in that it is zoomed from the wide position to a tele position thereof by moving the second through fourth lens units while keeping the first lens unit stationary, so as to widen an airspace reserved between the second lens unit and the third lens unit but to narrow another airspace reserved between the third lens unit and the fourth lens unit, and that it is configured so as to satisfy the following conditions (1) and (2):

$$0.02 < |f_3/f_1| < 0.22 \quad (1)$$
$$0.20 < |f_3/f_4| < 0.42 \quad (2)$$

wherein the reference symbols $f_1$, $f_3$ and $f_4$ represent focal lengths of the first lens unit, the third lens unit and the fourth lens unit respectively.

Generally speaking of the zoom lens systems which have wide field angles at the wide positions thereof, a zoom lens system comprising a negative lens unit on the object side has an advantage in that it allows offaxial rays to be incident lower on a front lens component disposed therein. It also allows the configuration of a front lens unit to be more compact than a zoom lens system comprising a positive lens unit on the object side.

In order to configure the zoom lens system according to the present invention to be more compact than the conventional zoom lens systems, the second positive lens unit and the third negative lens unit are moved so as to widen the airspace reserved between these lens units for zooming the zoom lens system from the wide position to the tele position.

When the lens units are moved as described above, rays are incident lower on the second lens unit at the wide position at which the offaxial rays are diverged more remarkably toward the object side, whereby the second lens unit is allowed to have a smaller diameter, or positive lens elements are allowed to have superfluous thickness at marginal portions thereof and can be thinner at central portions thereof.

Further, the fourth lens unit limits the height of the marginal rays at the tele position when the lens units are moved so as to narrow the airspace reserved between the third lens unit and the fourth lens unit for zooming the zoom lens system according to the present invention from the wide position to the tele position.

For the reasons described above, it is possible to lower the height of rays on the first lens unit and the second lens unit, thereby making it possible to prevent these lens units from having large diameters.

Furthermore, the zoom lens system according to the present invention has been configured to be compact by allocating a role of the compensator to at least one of the second lens unit through the fifth lens unit, and to be improved in savings of electrical power and operability thereof, by keeping the first lens unit, which is apt to be the largest lens unit; stationary always so as to reduce a force required for zooming the lens system.

On the basis of the concept described above, the present invention has succeeded in configuring the first negative lens unit and the second positive lens unit, which are, in particular, apt to be large, to be remarkably compact.

Moreover, the zoom lens system according to the present invention has been made to compact and the imaging performance thereof has been improved by configuring the lens system so as to satisfy the above-mentioned conditions (1) and (2).

The condition (1) defines a ratio between focal lengths of the first lens unit and the third lens unit which have the negative refractive powers. For configuring a zoom lens system to be compact, it is generally sufficient to configure the lens units which are to be moved for changing a magnification of the zoom lens system to be compact. In the case of a zoom lens system in which the lens unit is disposed on the object side has a negative refractive power, however, a second positive lens unit to be used therein must have a strong refractive power for converging rays coming from the first lens unit in diverged conditions. Accordingly, the second lens unit produces aberrations in large amounts and allows remarkable variations of aberrations to be caused by zooming, thereby making it impossible to obtain favorable imaging performance of the zoom lens system or necessary to remarkably increase a number of lens elements to be used therein for correction of aberrations. Therefore, a problem lies in the selection of a refractive power to be imparted to the first lens unit. In order to solve this problem, the present invention selects a strong refractive power and a weak refractive power for the third lens unit and the first lens unit respectively so as to satisfy the condition (1). When this condition is satisfied, it is possible to locate an entrance pupil close to a first surface of the zoom lens system so that rays will be incident low on the first lens unit.

If the upper limit of 0.22 of the condition (1) is exceeded, the first lens unit and the second lens unit will have strong refractive powers. If the lower limit of 0.02 of the condition (1) is exceeded, in contrast, the third lens unit will have too strong a refractive power, thereby bringing about adverse results such as aggravations of negative spherical aberration and positive curvature of field or necessity to increase a number of lens elements to be disposed in the zoom lens system.

The condition (2) defines a ratio between refractive powers of the third lens unit and the fourth lens unit. As already described above, the fourth lens unit is moved so as to narrow the airspace reserved between the third lens unit and the fourth lens unit which are disposed on both sides of the stop for zooming the lens system from the wide position to the tele position. By allowing rays to be incident nearly afocally or at adequate angles onto the fifth lens unit which serves mainly for imaging, it is possible to prevent the height of rays from being remarkably varied on and after the fifth lens unit or to suppress the variations of aberrations to minimum levels on and after the fifth lens unit. The condition (2) has been adopted so that the rays fall on the fifth lens unit as described above.

If the upper limit of 0.42 of the condition (2) is exceeded, the fourth lens unit will have a refractive power too strong for the refractive power of the third lens unit and undesirably allow strongly converged rays to emerge therefrom. If the lower limit of 0.20 of the condition (2) is exceeded, in contrast, the fourth lens unit will have too weak a refractive power, whereby the zoom lens system will have a long back focal length or rays will be incident high on the fifth lens unit. In this case, the zoom lens system will undesirably be composed of a large number of lens elements or cannot be configured to be compact.

In addition, for simplifying structures of a lens barrel, etc. so as to configure the zoom lens system, it is desirable to move the second lens unit through the fourth lens unit monotonously for zooming the lens system and impart the role of a compensator to the fifth lens unit.

The object of the present invention can be accomplished by satisfying only either of the conditions (1) and (2) described above. However, it is more desirable to configure the zoom lens system so as to satisfy both the conditions (1) and (2) at the same time.

The present invention relates also to a zoom lens system which comprises, in order from the object side, a first lens unit having a negative refractive power and a second lens unit having a positive refractive power, and is configured so as to be zoomed by varying at least an airspace reserved between the first lens unit and the second lens unit while keeping the first lens unit stationary. This zoom lens system is focused by moving a positive rear subunit toward the image side. The positive rear subunit is used in combination with a negative front subunit for composing the first lens unit and configured so as to satisfy the following condition (3):

$$0.7 < r_{1FR}/r_{1RF} < 1.5 \quad (3)$$

wherein the reference symbol $r_{1FR}$ represents a radius of curvature on an image side surface of the front subunit of the first lens unit and the reference symbol $r_{1RF}$ designates a radius of curvature on an object side surface of the rear subunit of the first lens unit.

When a zoom lens system is to be focused by moving some of the lens components (or a subunit) disposed in a first lens unit, it is found to be more advantageous to select, as a movable subunit, not a subunit which is disposed on the object side but a subunit which is disposed on the image side since the image side subunit is generally compacter and a movement of this subunit causes a smaller variation of a total length of the zoom lens system.

When the first lens unit is to be divided into two subunits, it can be of three types: a negative subunit and a negative subunit; a positive subunit and a negative subunit; and a negative subunit and a positive subunit. Let us assume that the rear subunit of each type is to be movable for focusing the zoom lens system. Out of the three types, the first lens unit which consists of the negative subunit and the negative subunit has a weak refractive power and must be moved for a long distance, thereby making it impossible to configure the zoom lens system compact. Further, the first lens unit which consists of the positive subunit and the negative subunit allows remarkable variations of aberrations since the positive subunit is disposed on the object side and the image side negative subunit has a strong refractive power, whereby the zoom lens system must comprise a large number of lens elements for reducing the variations of aberrations. Furthermore, the first lens unit of the type which consists of the negative subunit and the positive subunit is to be moved toward the image side for focusing the zoom lens system onto an object located at a short distance due to the fact that the positive subunit has a magnification higher than x1, has a simple composition and is to be moved for an adequate distance due to a proper refractive power distribution selected therefor.

However, the first lens unit which consists of the negative subunit and the positive subunit allows a remarkable variation of astigmatism at the tele position in particular as well as remarkable deviation between focused points in the sagittal direction and the meridional direction at marginal portions of a region within a field angle, thereby being incapable of providing favorable results.

In order to solve this problem, the second lens unit is located on the image side at the wide position of the zoom lens system according to the present invention. When the second lens unit is located as described above, the offaxial rays are incident low on the second lens unit, thereby making it possible to configure the zoom lens system compact and, at the same time, the second lens unit produces offaxial aberrations in smaller amounts in such directions as to cancel astigmatism produced by focusing the zoom lens system onto the object located at the short distance, thereby making it possible to reduce the variation of astigmatism. When the first lens unit which consists of the negative subunit and the positive subunit is used, image qualities can be further improved by configuring the zoom lens system so as to satisfy the above-mentioned condition (3).

The condition (3) defines a shape of an air lens to be formed between the front subunit and the rear subunit of the first lens unit. Selection of a value close to 1 for $r_{1FR}/r_{1RF}$ is advantageous for mechanically locating both surfaces of a lens close to each other and makes it possible to maintain the favorable imaging performance for the offaxial rays by cancelling aberrations between these surfaces at the wide position of the zoom lens system where rays are high.

If the upper limit of 1.5 of the condition (3) is exceeded, the object side surface of the rear subunit will have too strong a refractive power. Moreover, aberrations, those of high orders in particular, produced by the surface cannot cancel with aberrations produced by the image side surface of front subunit. If the lower limit of 0.7 of the condition (3) is exceeded, the image side surface of front subunit will have too strong a refractive power. Moreover, aberrations, those of high orders in particular, produced by the surface cannot cancel with aberrations produced by the object side surface of rear subunit. Further, it will be impossible to move the focusing lens unit for a long distance if either of the upper limit and the lower limit of the condition (3) is exceeded.

Moreover, when the composition of the first lens unit which consist of the negative front subunit and the positive rear subunit is adopted in combination with the selection of the rear subunit as a subunit movable toward the image side for focusing, it is possible to configure a compact zoom lens system allowing small variations of aberrations in either of the following two zoom lens systems. A first one which comprises, in order from the object side, a first lens unit having a negative refractive power, a second lens unit having a positive refractive power and a third lens unit having a negative refractive power. This first zoom lens system is zoomed by varying an airspace reserved between the first lens unit and the second lens unit and another airspace reserved between the second lens unit and the third lens unit. The second zoom lens system comprises, in order from the object side, a first lens unit having a negative refractive power, a second lens unit having a positive refractive power, a third lens unit having a negative refractive power and a fourth lens unit having a positive refractive power, and is configured so as to be zoomed by varying a plurality of airspaces out of an airspace reserved between the first lens unit and the second lens unit, an airspace reserved between the second lens unit and the third lens unit, and an airspace reserved between the third lens unit and the fourth lens unit.

In this case also, it is desirable to satisfy the condition (3) for the reason already described above with reference to this condition.

In addition, the present invention is characterized also in that it adopts the desirable focusing method for such a zoom lens system consisting of five lens units as already described above. Speaking concretely, the zoom lens system according to the present invention consists, in order from the object side, of a first lens unit having a negative refractive power, a second lens unit having a positive refractive power, a third lens unit having a negative refractive power, a stop, a fourth lens unit having a positive refractive power and a fifth lens unit having a positive refractive power; and is configured so as to be zoomed from the wide position to the tele position thereof by moving the second through fourth lens units, with the first lens unit kept stationary, so as to widen an airspace reserved between the second lens unit and the third lens unit but narrow an airspace reserved between the third lens unit and the fourth lens unit. This zoom lens system is focused by moving a rear subunit which is toward the image side used in combination with a negative front subunit for composing the first lens unit, and is configured so as to satisfy the condition (3).

Also for the zoom lens system according to the present invention which consists of the five lens units and adopts the focusing method described above, it is desirable to satisfy the above-mentioned conditions (1) and (2) for the reason already described above.

In order to maintain the favorable imaging performance of the zoom lens system according to the present invention in all photographing conditions (in all zoomed positions and all focused conditions) thereof, it is desirable in particular to select a glass material having a high anormalous dispersing characteristic for positive lens elements to be used for composing the positive lens units so as to reduce a secondary spectrum. For reducing a variation of chromatic aberration to be caused by focusing the zoom lens system according to the present invention, it is desirable to configure the focusing lens unit so as to be achromatic by using at least one negative lens element and one positive lens element in this lens unit.

By selecting the composition described above and configuring the zoom lens system so as to satisfy the conditions mentioned above, it is possible to reduce variations of aberrations for images of objects located within a range from infinite distance to an extremely short distance. Further, it is more effective for reducing the variations of aberrations to satisfy the following condition (4):

$$0.4 < |f_1/f_{1R}| < 0.07 \qquad (4)$$

wherein the reference symbol $f_{1R}$ represents a focal length of the rear subunit of the first lens unit.

The condition (4) defines a ratio between a focal length of the first lens unit as a whole and a focal length of the rear subunit of the first lens unit. The focal length of the first lens unit as a whole is determined dependently on a focal length of the front subunit, that of the rear subunit and a distance as measured between principal points of these subunits. By weakening the refractive power of the rear subunit so as to prolong the focal length $f_{1R}$ of the rear subunit which has a positive refractive power as a whole in the first lens unit, it is possible to strengthen the negative refractive power of the first lens unit as a whole without changing the refractive power of the front subunit which has a strong negative total refractive power as a whole in the first lens unit. The weakening of the positive refractive power of the rear subunit makes it possible to shorten the focal length $f_1$ of the first lens unit as a whole and is therefore desirable for configuring the zoom lens system to be compact. Further, the lengthening of the focal length $f_{1R}$ results in lengthening of the distance for which the rear subunit is to be moved for focusing the zoom lens system, but is not contrary to the compact configuration of the zoom lens system since the distance d between the principal points is shortened for maintaining $f_1/f_{1R}$ at a low level. By lengthening the focal length $f_{1R}$ as described above, it is possible to prevent an increase in the aberrations by strengthening the refractive power of the rear subunit (or shortening the focal length $f_{1R}$), or to obtain a zoom lens system which allows little variation in the aberrations.

If the upper limit of the condition (4) is exceeded, the focal length $f_{1R}$ will be short, thereby making it difficult to reduce the variation in aberrations. If the upper limit of the condition (4) is exceeded, it will be difficult to reserve a space sufficient for focusing the zoom lens system.

BRIEF DESCRIPTION OF THE DRAWINGS

FIG. 5A, FIG. 5B, FIG. 5C, FIG. 5D and FIG. 5E show graphs illustrating aberration characteristics of the first embodiment of the present invention in a condition where it is focused on an object located at an infinite distance, in the wide position thereof;

FIG. 6A, FIG. 6B, FIG. 6C, FIG. 6D and FIG. 6E show graphs illustrating aberration characteristics of the first embodiment of the present invention in a condition where it is focused on the object located at an infinite distance, in an intermediate focal length thereof;

FIG. 7A, FIG. 7B, FIG. 7C, FIG. 7D and FIG. 7E show curves illustrating aberration characteristics of the first embodiment of the present invention in a condition where it is focused on the object located at an infinite distance, in the tele position thereof;

FIG. 10A, FIG. 10B, FIG. 10C, FIG. 10D and FIG. 10E show curves illustrating aberration characteristics of the first embodiment of the present invention in a condition where it is focused on the object located at the distance of 1 m, an the tele position thereof;

FIG. 11A, FIG. 11B, FIG. 11C, FIG. 11D and FIG. 11E show graphs illustrating aberration characteristics of the second embodiment of the present invention in a condition where it is focused on the object located at an infinite distance, in the wide position thereof;

FIG. 12A, FIG. 12B, FIG. 12C, FIG. 12D and FIG. 12E show graphs visualizing aberration characteristics of the second embodiment of the present invention in a condition where it is focused on the object located at an infinite distance, at the intermediate focal length thereof;

FIG. 13A, FIG. 13B, FIG. 13C, FIG. 13D and FIG. 13E show graphs visualizing aberration characteristics of the second embodiment of the present invention in a condition where it is focused on the object located at an infinite distance at the tele position thereof;

FIG. 14A, FIG. 14B, FIG. 14C, FIG. 14D and FIG. 14E show graphs visualizing aberration characteristics of the second embodiment of the present invention in a condition where it is focused on an object located at a distance of 0.5 m, in the wide position thereof;

FIG. 15A, FIG. 15B, FIG. 15C, FIG. 15D and FIG. 15E show graphs visualizing aberration characteristics of the second embodiment of the present invention in a condition where it is focused on the object located at the distance of 0.5 m, at the intermediate focal length thereof.

DETAILED DESCRIPTION OF THE PREFERRED EMBODIMENTS

Figure 1:
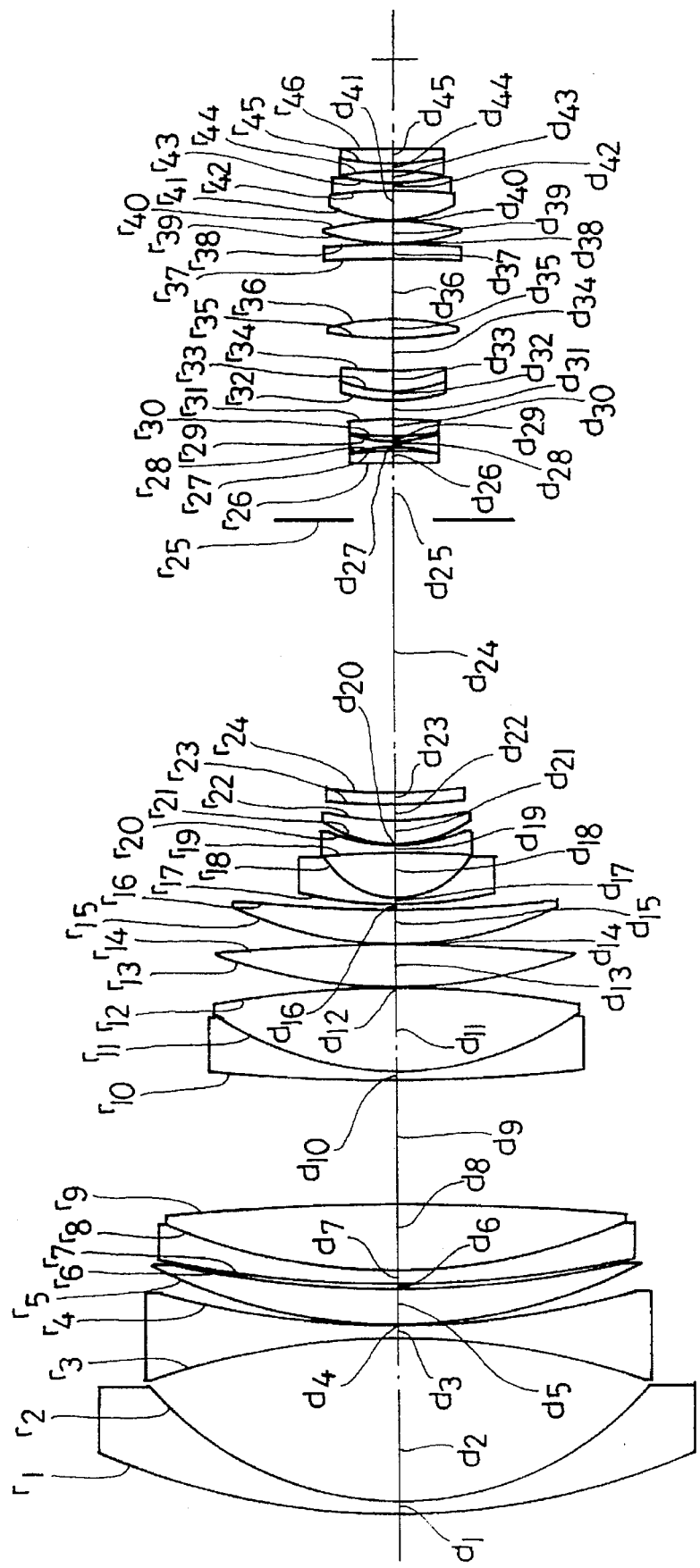
FIG. 1 shows a sectional view illustrating a composition of a first embodiment of the zoom lens system according to the present invention.

Now, the zoom lens system according to the present invention will be described more detailedly below with reference to the preferred embodiments illustrated in the accompanying drawings and given in the form of the numerical data shown below:

Embodiment 1
$f = 5.2 \sim 14.7 \sim 41.6$, F/2~2.3,
$2\omega = 75.1° \sim 11°$

| | | | |
|---|---|---|---|
| $r_1 = 104.7575$ | | | |
| | $d_1 = 1.500$ | $n_1 = 1.69979$ | $\nu_1 = 55.52$ |
| $r_2 = 43.8923$ | | | |
| | $d_2 = 22.000$ | | |
| $r_3 = -102.0966$ | | | |
| | $d_3 = 1.500$ | $n_2 = 1.49845$ | $\nu_2 = 81.61$ |
| $r_4 = 108.1695$ | | | |
| | $d_4 = 0.150$ | | |
| $r_5 = 69.2774$ | | | |
| | $d_5 = 5.000$ | $n_3 = 1.81265$ | $\nu_3 = 25.43$ |
| $r_6 = 143.8087$ | | | |
| | $d_6 = 0.800$ | | |
| $r_7 = 156.5254$ | | | |
| | $d_7 = 1.500$ | $n_4 = 1.81265$ | $\nu_4 = 25.43$ |
| $r_8 = 77.5399$ | | | |
| | $d_8 = 8.900$ | $n_5 = 1.62033$ | $\nu_5 = 63.38$ |
| $r_9 = -355.5114$ | | | |
| | $d_9 = D_1$ (variable) | | |
| $r_{10} = 211.4369$ | | | |
| | $d_{10} = 1.200$ | $n_6 = 1.62058$ | $\nu_6 = 36.63$ |
| $r_{11} = 42.2932$ | | | |
| | $d_{11} = 11.200$ | $n_7 = 1.49845$ | $\nu_7 = 81.61$ |
| $r_{12} = -142.1304$ | | | |
| | $d_{12} = 0.100$ | | |
| $r_{13} = 70.1934$ | | | |
| | $d_{13} = 5.800$ | $n_8 = 1.45720$ | $\nu_8 = 90.31$ |
| $r_{14} = -256.0160$ | | | |
| | $d_{14} = 0.150$ | | |
| $r_{15} = 48.4525$ | | | |
| | $d_{15} = 4.500$ | $n_9 = 1.48915$ | $\nu_9 = 70.20$ |
| $r_{16} = 179.3501$ | | | |
| | $d_{16} = D_2$ (variable) | | |
| $r_{17} = 61.6137$ | | | |
| | $d_{17} = 1.000$ | $n_{10} = 1.69974$ | $\nu_{10} = 56.49$ |
| $r_{18} = 11.9154$ | | | |
| | $d_{18} = 5.820$ | | |
| $r_{19} = -205.6944$ | | | |
| | $d_{19} = 1.000$ | $n_{11} = 1.61992$ | $\nu_{11} = 54.04$ |
| $r_{20} = 25.4345$ | | | |
| | $d_{20} = 0.150$ | | |
| $r_{21} = 17.7766$ | | | |
| | $d_{21} = 3.200$ | $n_{12} = 1.81265$ | $\nu_{12} = 25.43$ |
| $r_{22} = 46.8536$ | | | |
| | $d_{22} = 2.130$ | | |
| $r_{23} = 122.0583$ | | | |
| | $d_{23} = 1.500$ | $n_{13} = 1.69979$ | $\nu_{13} = 55.52$ |
| $r_{24} = 67.2148$ | | | |
| | $d_{24} = D_3$ (variable) | | |
| $r_{25} = \infty$ (stop) | | | |
| | $d_{25} = D_4$ (variable) | | |
| $r_{26} = 186.1040$ | | | |
| | $d_{26} = 1.500$ | $n_{14} = 1.82017$ | $\nu_{14} = 46.42$ |
| $r_{27} = -101.3449$ | | | |
| | $d_{27} = 0.700$ | | |
| $r_{28} = -18.3936$ | | | |
| | $d_{28} = 0.900$ | $n_{15} = 1.53430$ | $\nu_{15} = 48.90$ |
| $r_{29} = 24.2057$ | | | |
| | $d_{29} = 0.500$ | | |

-continued

| | | | |
|---|---|---|---|
| $r_{30} = 42.9796$ | | | |
| | $d_{30} = 2.150$ | $n_{16} = 1.82017$ | $v_{16} = 46.62$ |
| $r_{31} = -107.1809$ | | | |
| | $d_{31} = 2.590$ | | |
| $r_{32} = 25.4105$ | | | |
| | $d_{32} = 1.300$ | $n_{17} = 1.72311$ | $v_{17} = 29.51$ |
| $r_{33} = 20.5253$ | | | |
| | $d_{33} = 2.810$ | $n_{18} = 1.49845$ | $v_{18} = 81.61$ |
| $r_{34} = 68.6450$ | | | |
| | $d_{34} = 4.180$ | | |
| $r_{35} = 56.6063$ | | | |
| | $d_{35} = 2.300$ | $n_{19} = 1.48915$ | $v_{19} = 70.20$ |
| $r_{36} = -42.9791$ | | | |
| | $d_{36} = D_5$ (variable) | | |
| $r_{37} = -234.5441$ | | | |
| | $d_{37} = 1.800$ | $n_{20} = 1.77620$ | $v_{20} = 49.66$ |
| $r_{38} = -134.0375$ | | | |
| | $d_{38} = 0.200$ | | |
| $r_{39} = 32.1197$ | | | |
| | $d_{39} = 3.000$ | $n_{21} = 1.49845$ | $v_{21} = 81.61$ |
| $r_{40} = -42.8673$ | | | |
| | $d_{40} = 0.150$ | | |
| $r_{41} = 17.8524$ | | | |
| | $d_{41} = 4.000$ | $n_{22} = 1.60520$ | $v_{22} = 65.48$ |
| $r_{42} = -50.6161$ | | | |
| | $d_{42} = 0.996$ | $n_{23} = 1.60718$ | $v_{23} = 38.01$ |
| $r_{43} = 40.0275$ | | | |
| | $d_{43} = 1.610$ | | |
| $r_{44} = -40.9076$ | | | |
| | $d_{44} = 1.000$ | $n_{24} = 1.85501$ | $v_{24} = 23.88$ |
| $r_{45} = 40.0765$ | | | |
| | $d_{45} = 1.800$ | $n_{25} = 1.60520$ | $v_{25} = 65.48$ |
| $r_{46} = -1542.0944$ | | | |

| f | 5.2 | 14.7 | 41.6 |
|---|---|---|---|
| $D_1$ | 16.9553 | 13.3200 | 8.5475 |
| $D_2$ | 0.8190 | 25.5648 | 41.7820 |
| $D_3$ | 35.0553 | 13.9448 | 2.5000 |
| $D_4$ | 8.8341 | 5.5214 | 2.0000 |
| $D_5$ | 8.3005 | 10.4894 | 17.2889 |

Distances ($d_6$ and $d_9$) in a condition focused on an object located at a distance of 1 m

| f | 5.2 | 14.7 | 41.6 |
|---|---|---|---|
| $d_6$ | 8.545 | 8.545 | 8.545 |
| $d_9$ | 9.211 | 5.576 | 0.803 |

$|f_3/f_1| = 0.14$, $|f_3/f_4| = 0.40$, $r_{1FR}/r_{1RF} = 0.92$
$|f_1/f_{1R}| = 0.58$

Embodiment 2
$f = 6\sim17\sim48$, F/2~2.3, $2\omega = 67.4°\sim9.5°$

| | | | |
|---|---|---|---|
| $r_1 = 101.3208$ | | | |
| | $d_1 = 1.500$ | $n_1 = 1.69979$ | $v_1 = 55.52$ |
| $r_2 = 41.8728$ | | | |
| | $d_2 = 24.000$ | | |
| $r_3 = -76.3250$ | | | |
| | $d_3 = 1.500$ | $n_2 = 1.48915$ | $v_2 = 70.20$ |
| $r_4 = 596.8501$ | | | |
| | $d_4 = 0.100$ | | |
| $r_5 = 79.1635$ | | | |
| | $d_5 = 5.000$ | $n_3 = 1.81265$ | $v_3 = 25.43$ |
| $r_6 = 151.5921$ | | | |
| | $d_6 = 0.800$ | | |
| $r_7 = 164.0012$ | | | |
| | $d_7 = 1.500$ | $n_4 = 1.81265$ | $v_4 = 25.43$ |
| $r_8 = 109.0124$ | | | |
| | $d_8 = 0.150$ | | |
| $r_9 = 108.8846$ | | | |
| | $d_9 = 11.000$ | $n_5 = 1.62033$ | $v_5 = 63.38$ |
| $r_{10} = -135.7770$ | | | |
| | $d_{10} = D_1$ (variable) | | |
| $r_{11} = 322.6634$ | | | |
| | $d_{11} = 1.200$ | $n_6 = 1.62058$ | $v_6 = 36.63$ |
| $r_{12} = 39.5509$ | | | |
| | $d_{12} = 11.5000$ | $n_7 = 1.49845$ | $v_7 = 81.61$ |
| $r_{13} = -204.2896$ | | | |
| | $d_{13} = 0.100$ | | |
| $r_{14} = 62.1166$ | | | |
| | $d_{14} = 5.500$ | $n_8 = 1.45720$ | $v_8 = 90.31$ |
| $r_{15} = -627.0140$ | | | |
| | $d_{15} = 0.150$ | | |
| $r_{16} = 50.7693$ | | | |
| | $d_{16} = 4.500$ | $n_9 = 1.48915$ | $v_9 = 70.20$ |
| $r_{17} = 146.3386$ | | | |
| | $d_{17} = D_2$ (variable) | | |
| $r_{18} = 87.9967$ | | | |
| | $d_{18} = 1.000$ | $n_{10} = 1.69974$ | $v_{10} = 56.49$ |
| $r_{19} = 12.2159$ | | | |
| | $d_{19} = 5.100$ | | |
| $r_{20} = -336.6204$ | | | |
| | $d_{20} = 1.000$ | $n_{11} = 1.61992$ | $v_{11} = 54.04$ |
| $r_{21} = 28.2685$ | | | |
| | $d_{21} = 0.150$ | | |
| $r_{22} = 17.7647$ | | | |
| | $d_{22} = 3.000$ | $n_{12} = 1.76260$ | $v_{12} = 25.07$ |
| $r_{23} = 40.8192$ | | | |
| | $d_{23} = 2.130$ | | |
| $r_{24} = 101.8674$ | | | |
| | $d_{24} = 1.500$ | $n_{13} = 1.69979$ | $v_{13} = 55.52$ |
| $r_{25} = 79.9427$ | | | |
| | $d_{25} = D_3$ (variable) | | |
| $r_{26} = \infty$ (stop) | | | |
| | $d_{26} = D_4$ (variable) | | |
| $r_{27} = 138.1307$ | | | |
| | $d_{27} = 1.500$ | $n_{14} = 1.82017$ | $v_{14} = 46.62$ |
| $r_{28} = -140.4265$ | | | |
| | $d_{28} = 0.700$ | | |
| $r_{29} = -18.3224$ | | | |
| | $d_{29} = 0.900$ | $n_{15} = 1.53430$ | $v_{15} = 48.90$ |
| $r_{30} = 24.6924$ | | | |
| | $d_{30} = 0.500$ | | |
| $r_{31} = 41.1549$ | | | |
| | $d_{31} = 2.130$ | $n_6 = 1.82017$ | $v_{16} = 46.62$ |
| $r_{32} = -104.2509$ | | | |
| | $d_{32} = 2.500$ | | |
| $r_{33} = 25.5225$ | | | |
| | $d_{33} = 1.300$ | $n_{17} = 1.72311$ | $v_{17} = 29.51$ |
| $r_{34} = 20.6084$ | | | |
| | $d_{34} = 2.800$ | $n_{18} = 1.49845$ | $v_{18} = 81.61$ |
| $r_{35} = 66.4713$ | | | |
| | $d_{35} = 2.930$ | | |
| $r_{36} = 57.7726$ | | | |
| | $d_{36} = 2.300$ | $n_{19} = 1.48915$ | $v_{19} = 70.20$ |
| $r_{37} = -47.2622$ | | | |
| | $d_{37} = D_5$ (variable) | | |
| $r_{38} = -321.5152$ | | | |
| | $d_{38} = 1.800$ | $n_{20} = 1.77620$ | $v_{20} = 49.66$ |
| $r_{39} = -112.8720$ | | | |
| | $d_{39} = 0.200$ | | |
| $r_{40} = 35.6666$ | | | |
| | $d_{40} = 3.000$ | $n_{21} = 1.49845$ | $v_{21} = 81.61$ |
| $r_{41} = -40.1541$ | | | |
| | $d_{41} = 0.150$ | | |
| $r_{42} = 17.9270$ | | | |
| | $d_{42} = 4.000$ | $n_{22} = 1.60520$ | $v_{22} = 65.48$ |
| $r_{43} = 423.9130$ | | | |
| | $d_{43} = 0.800$ | $n_{23} = 1.60718$ | $v_{23} = 38.01$ |
| $r_{44} = 38.6021$ | | | |
| | $d_{44} = 1.630$ | | |
| $r_{45} = -39.8677$ | | | |
| | $d_{45} = 1.000$ | $n_{24} = 1.85501$ | $v_{24} = 23.88$ |
| $r_{46} = 36.6759$ | | | |
| | $d_{46} = 1.800$ | $n_{25} = 1.60520$ | $v_{25} = 65.48$ |
| $r_{47} = 284.3932$ | | | |

| f | 6 | 17 | 48 |
|---|---|---|---|
| $D_1$ | 18.4336 | 14.7163 | 12.0130 |
| $D_2$ | 0.8190 | 26.1191 | 41.5662 |
| $D_3$ | 36.8267 | 15.2438 | 2.5000 |
| $D_4$ | 8.1729 | 6.0173 | 2.0000 |
| $D_5$ | 8.3638 | 9.4596 | 17.9544 |

-continued

Distances ($d_6$ and $d_{10}$) in a condition focused on an object located at a distance of 0.5 m

| f | 6 | 17 | 48 |
|---|---|---|---|
| $d_6$ | 12.012 | 12.012 | 12.012 |
| $d_{10}$ | 7.222 | 3.504 | 0.801 |

$|f_3/f_1| = 0.046$, $|f_3/f_4| = 0.39$, $r_{1FR}/r_{1RF} = 0.92$
$|f_1/f_{1R}| = 0.65$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represents Abbe's numbers of the respective lens elements.

Figure 2:
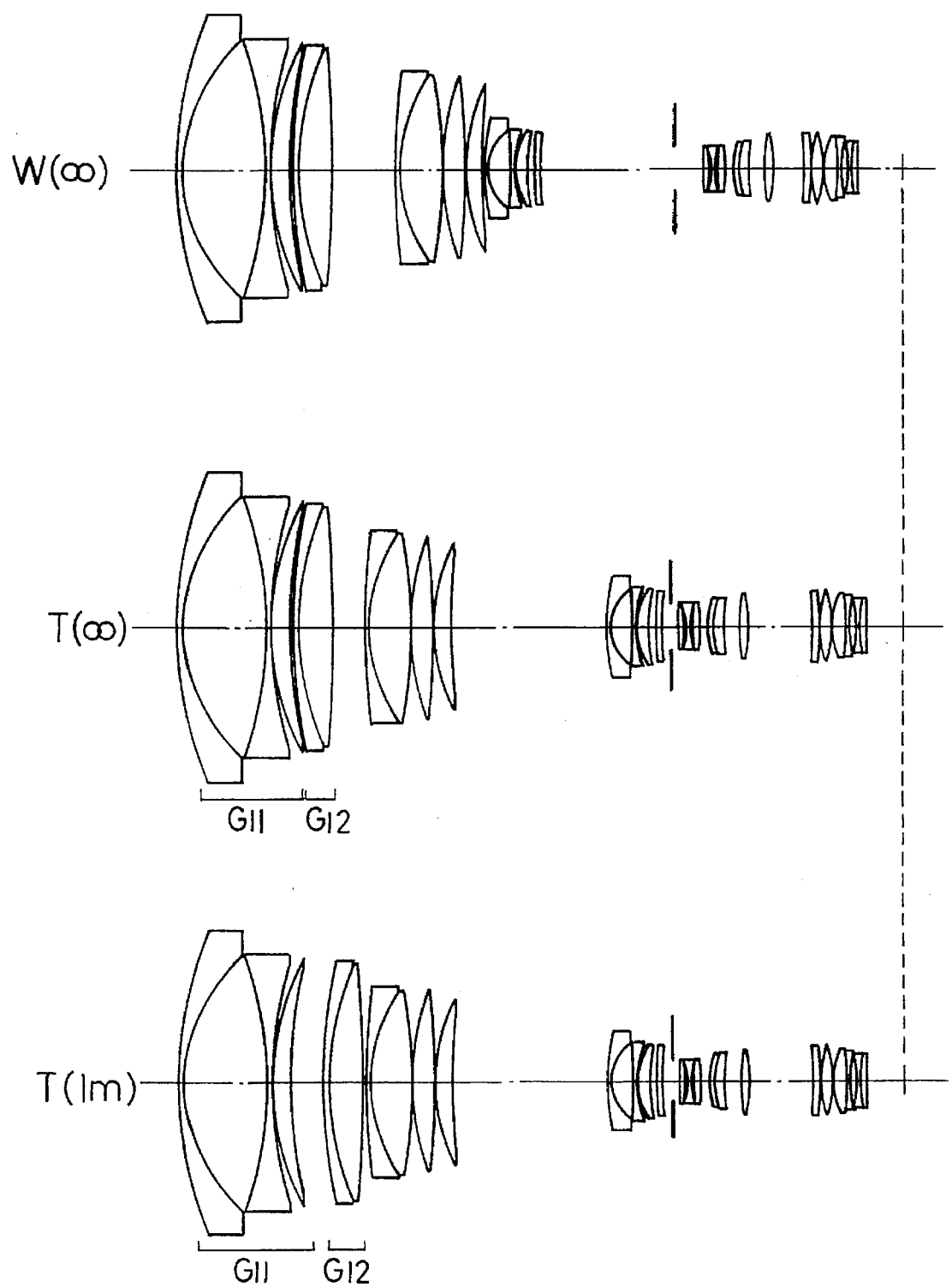
FIG. 2 shows sectional views illustrating compositions of the first embodiment of the present invention in conditions where it is focused on an object located at a short distance in a wide position and a tele position thereof.

The first embodiment of the present invention has the composition illustrated in FIG. 1, or is a zoom lens system composed of five lens units. Further, the first embodiment comprises airspaces $d_9$, $d_{16}$, $d_{24}$, $d_{25}$ and $d_{36}$ ($D_1$ through $D_5$which are variable for zooming as is seen from FIG. 2, or is zoomed from the wide position to the tele position by widening the airspace $d_{16}$ ($D_2$) reserved between the second lens unit and the third lens unit, and progressively narrowing the airspaces $d_{24}$ and $d_{25}$ ($D_3$ and $D_4$) reserved between the third lens unit and the fourth lens unit. Furthermore, the first lens unit of the first embodiment consists of a negative front subunit $G_{11}$ and a positive rear subunit $G_{12}$, which is to be moved toward the image side (to vary $d_6$ and $d_9$) for focusing the zoom lens system. When the first embodiment is focused on an object located at a distance of 1 m, the airspaces $d_6$ and $d_9$ are set at the distances specified in the numerical data. In addition, the reference symbols W(∞) and T(∞) used in FIG. 2 represent compositions of the first embodiment in conditions where it is focused on an object located at an infinite distance in the wide position and the tele position respectively, whereas the reference symbol T(1 m) designates a composition of the first embodiment in a condition where it is focused on an object located at a distance of 1 m, in the tele position.

The first embodiment of the present invention has the aberration characteristics illustrated in FIG. 5A, FIG. 5B, FIG. 5C, FIG. 5D, FIG. 5E, FIG. 6A, FIG. 6B, FIG. 6C, FIG. 6D, FIG. 6E, FIG. 7A, FIG. 7B, FIG. 7C, FIG. 7D and FIG. 7E when it is focused on the object located at an infinite distance, and the aberration characteristics shown in FIG. 8A, FIG. 8B, FIG. 8C, FIG. 8D, FIG. 8E, FIG. 9A, FIG. 9B, FIG. 9C, FIG. 9D, FIG. 9E, FIG. 10A, FIG. 10B, FIG. 10C, FIG. 10D and FIG. 10E when it is focused on the object located at the distance of 1 m.

Figure 3:
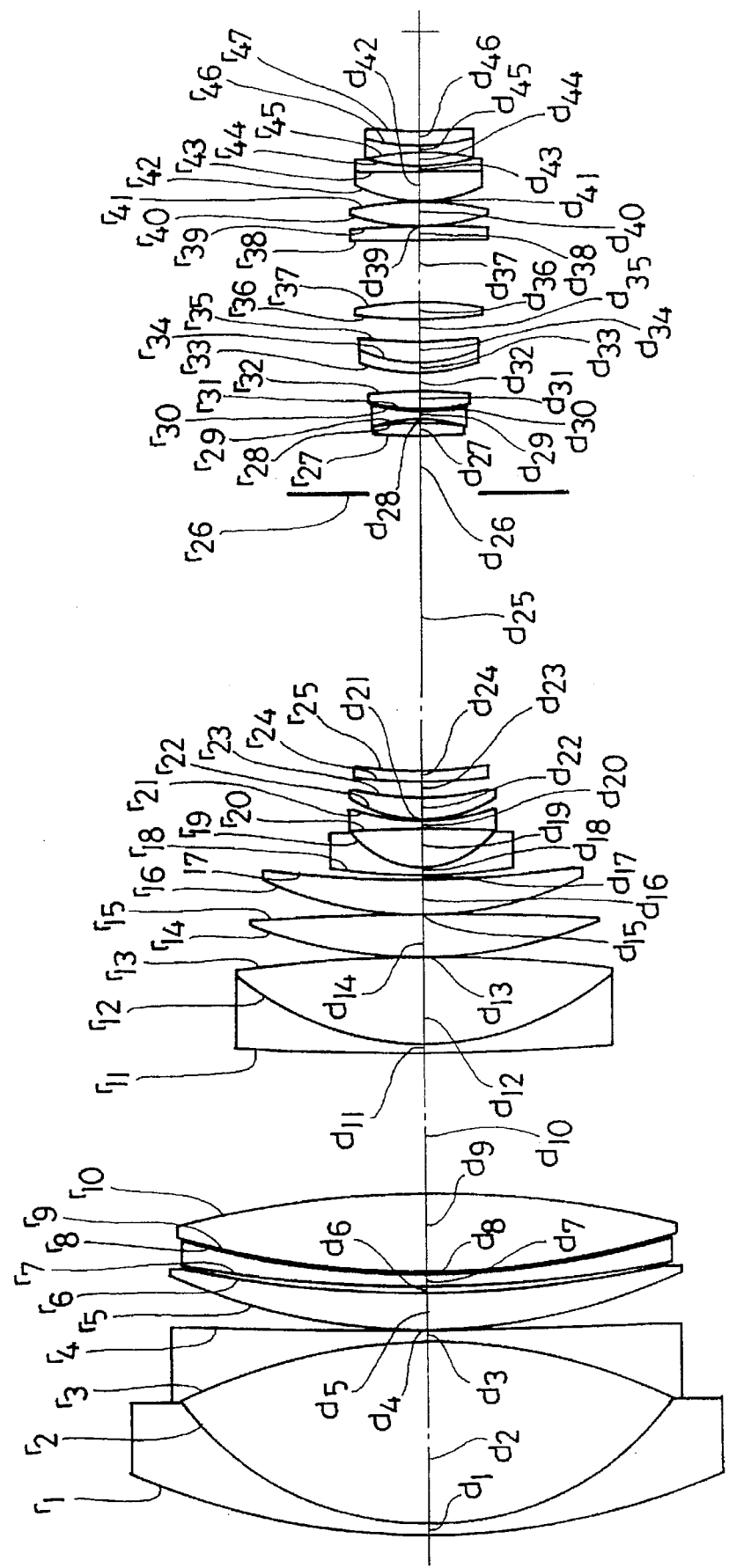
FIG. 3 shows a sectional view illustrating a composition of a second embodiment of the zoom lens system according to the present invention.
Figure 4:
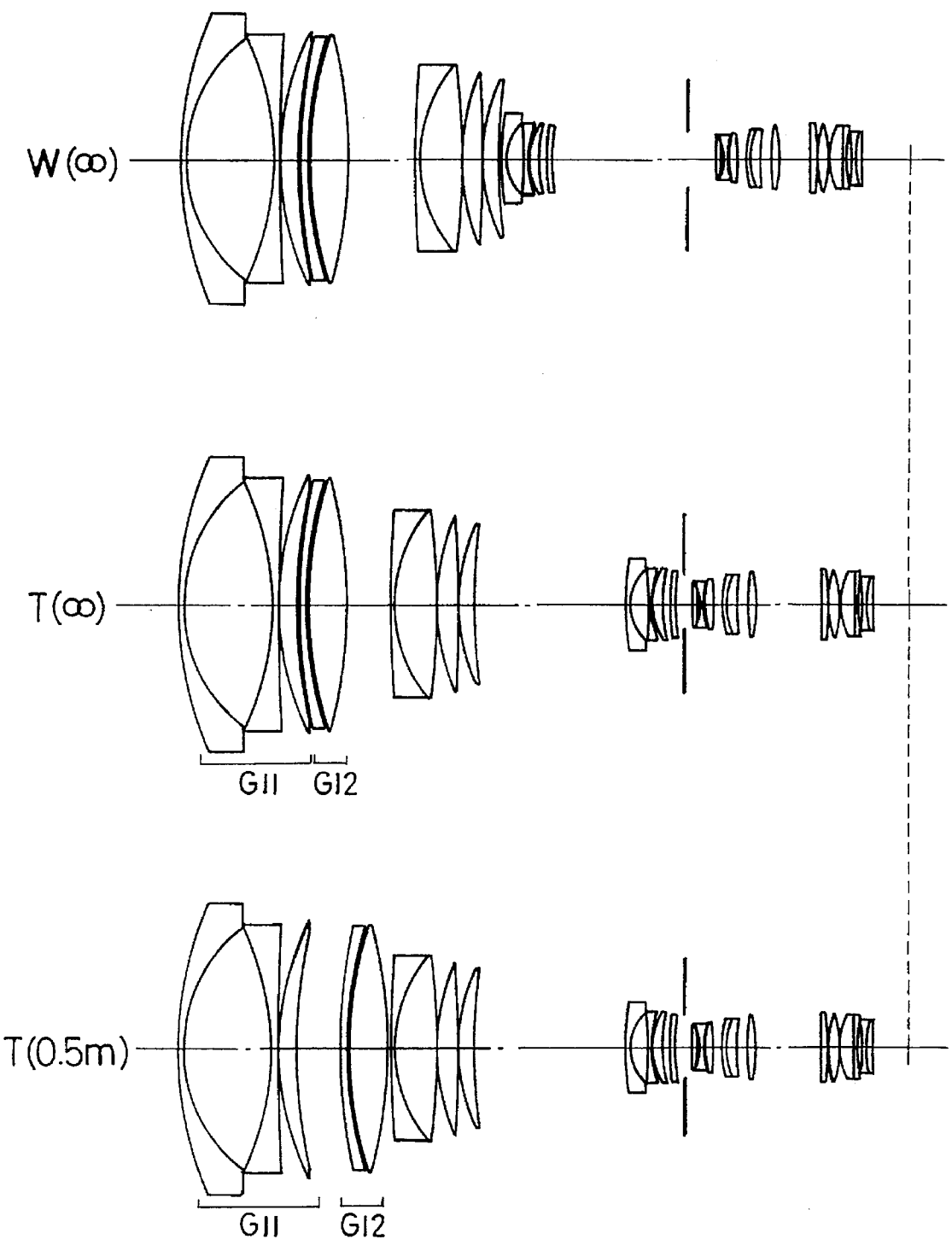
FIG. 4 shows sectional views illustrating compositions of the second embodiment of the present invention in conditions where it is focused on the object located at a short distance, in the wide position and the tele position thereof.
Figure 8A:
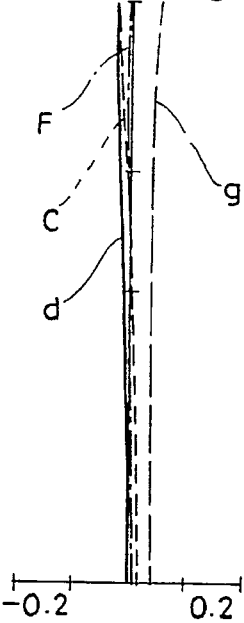
FIG. 8A, FIG. 8B, FIG. 8C, FIG. 8D and FIG. 8E show curves illustrating aberration characteristics of the first embodiment of the present invention in a condition where it is focused on an object located at a distance of 1 m, in the wide position thereof.
Figure 8B:
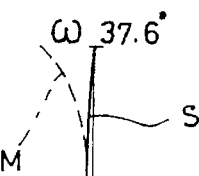
Figure 8C:
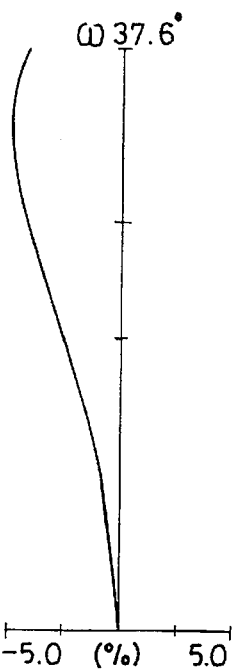
Figure 8D:
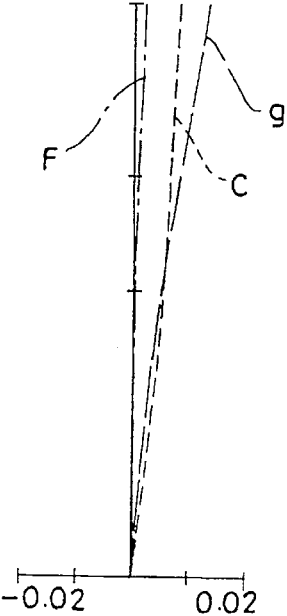
Figure 8E:
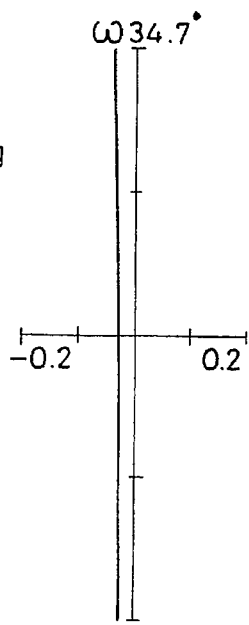
Figure 9A:
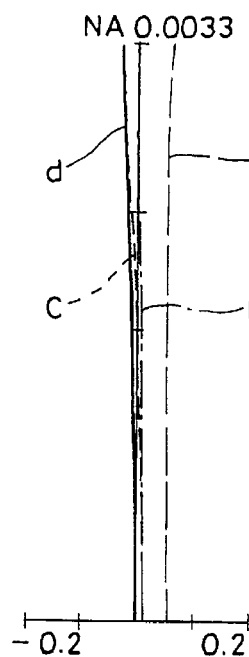
FIG. 9A, FIG. 9B, FIG. 9C, FIG. 9D and FIG. 9E show curves illustrating aberration characteristics of the first embodiment of the present invention in a condition where it is focused on the object located at the distance of 1 m, at the intermediate focal length thereof.
Figure 9B:
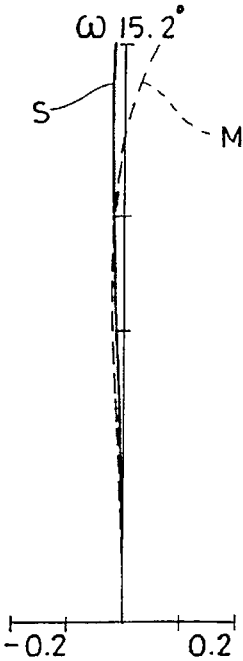
Figure 9C:
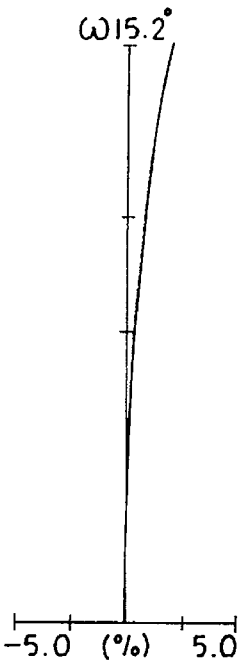
Figure 9D:
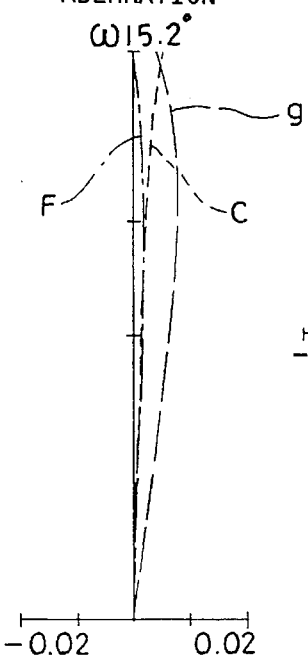
Figure 9E:
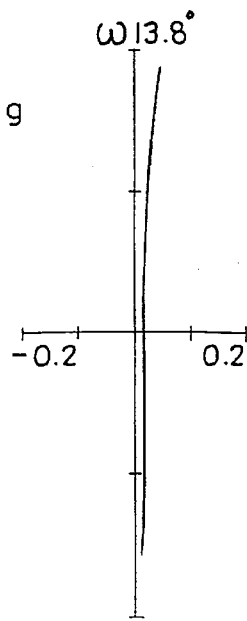
Figure 16A:
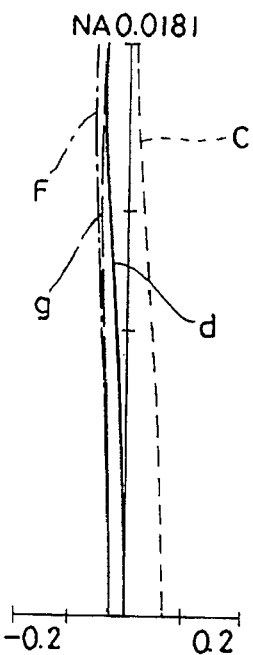
FIG. 16A, FIG. 16B, FIG. 16C, FIG. 16D and FIG. 16E show graphs visualizing aberration characteristics of the second embodiment of the present invention in a condition where it is focused on the object located at the distance of 0.5 m in at the tele position thereof.
Figure 16B:
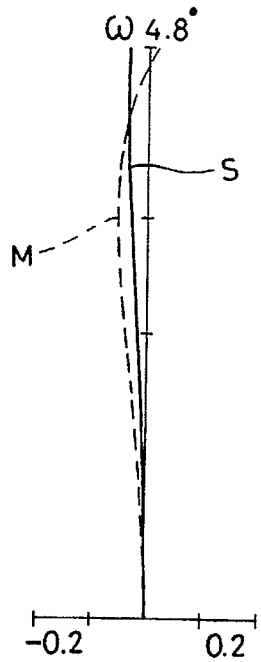
Figure 16C:
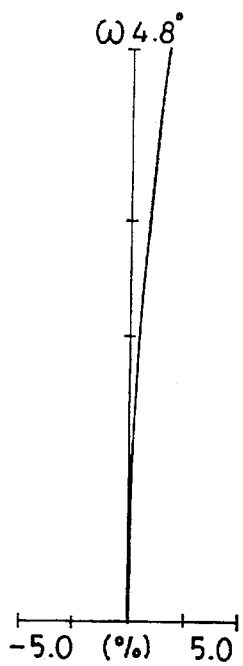
Figure 16D:
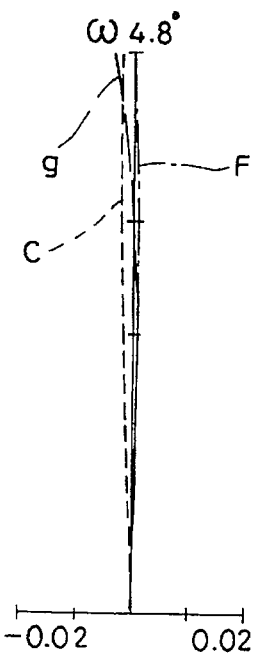
Figure 16E:
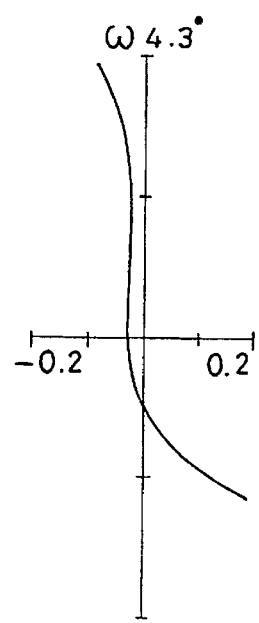

The second embodiment of the present invention has the composition illustrated in FIG. 3, or is a zoom lens system consisting of five lens units. As is seen from FIG. 4, the second embodiment is zoomed by varying airspaces $d_{10}$, $d_{17}$, $d_{25}$, $d_{26}$ and $d_{37}$ ($D_1$, $D_2$, $D_3$, $D_4$ and $D_5$). Further, the first lens unit of the second embodiment consists of a negative front subunit $G_{11}$ ($r_1$ through $r_6$) and a positive rear subunit $G_{12}$ ($r_7$ through $r_{10}$), which is to be moved toward the image side for focusing the zoom lens system. When the second embodiment is focused on an object located at a distance of 0.5 m, the airspaces $d_6$ and $d_{10}$ are set at the distances specified in the numerical data thereof. In addition, the reference symbols W(∞) and T(∞) used in FIG. 4 represent compositions of the second embodiment in a condition where it is focused on the object located at an infinite distance, in the wide position and the tele position respectively, whereas the reference symbol T(0.5 m) designates a composition of the second embodiment in a condition where it is focused on an object located at the distance of 0.5 m.

When the second embodiment is focused on the object located at an infinite distance, it has the aberration characteristics illustrated in FIG. 11A, FIG. 11B, FIG. 11C, FIG. 11D, FIG. 11E, FIG. 12A, FIG. 12B, FIG. 12C, FIG. 12D, FIG. 12E, FIG. 13A, FIG. 13B, FIG. 13C, FIG. 13D and FIG. 13E. When the second embodiment is focused on the object located at the distance of 0.5 m, it exhibits the aberration characteristics shown in FIG. 14A, FIG. 14B, FIG. 14C, FIG. 14D, FIG. 14E, FIG. 15A, FIG. 15B, FIG. 15C, FIG. 15D, FIG. 15E, FIG. 16A, FIG. 16B, FIG. 16C, FIG. 16D and FIG. 16E.

The zoom lens system according to the present invention has a field angle as wide as 75° at the wide position thereof, a vari-focal ratio as high as 8, a compact size, and favorable imaging performance over the entire zooming range thereof and in all photographing conditions where it is focused on objects located within a range from an infinite distance to a short distance.

I claim:

1. A zoom lens system for use in TV cameras comprising, in order from an object side:

a stationary first lens unit which is stationary during zooming of said zoom lens system and has a negative refractive power, said stationary first lens unit consisting of:

a stationary negative front subunit which is stationary during zooming of said zoom lens system, and a movable positive rear subunit which is movable toward an image side of said zoom lens system for focusing said zoom lens system;

a second lens unit having a positive refractive power, a first airspace being reserved between said stationary first lens unit and said second lens unit, said first airspace being variable in length for zooming said zoom lens system;

a stationary stop disposed to an image side of said second lens unit, said stationary stop being fixed on an optical axis of said zoom lens system; and an additional lens unit disposed to an image side of said stationary stop.

2. A zoom lens system according to claim 1, wherein:

said zoom lens system satisfies the following condition (3):

$$0.7 < r_{1FR}/r_{1RF} < 1.5 \qquad (3)$$

wherein said reference symbol $r_{1FR}$ represents a radius of curvature of an image side surface of said stationary negative front subunit, and said reference symbol $r_{1RF}$ designates a radius of curvature of an object side surface of said movable positive rear subunit.

3. A zoom lens system for use in TV cameras comprising, in order from an object side:

a first lens unit having a negative refractive power, said first lens unit consisting of:

a stationary negative front subunit which is stationary during zooming of said zoom lens system, and a movable positive rear subunit which is movable toward an image side of said zoom lens system for focusing said zoom lens system;

a second lens unit having a positive refractive power;

a third lens unit disposed on said image side of said second lens unit and having a negative refractive power;

a stationary stop disposed to an image side of said third lens unit, said stationary stop being fixed on an optical axis of said zoom lens system; and a fourth lens unit disposed to an image side of said stationary stop;

wherein at least one of a first airspace reserved between said first lens unit and said second lens unit, and a second airspace reserved between said second lens unit and said third lens unit, is variable in axial length for zooming said zoom lens system.

4. A zoom lens system according to claim 3, wherein:
said fourth lens unit has a positive refractive power.

5. A zoom lens system for use in TV cameras comprising, in order from an object side:

a first lens unit having a negative refractive power, said first lens unit consisting of:
 a stationary negative front subunit which is stationary during zooming of said zoom lens system, and
 a movable positive rear subunit which is movable toward an image side of said zoom lens system for focusing said zoom lens system;

a second lens unit having a positive refractive power;

a third lens unit disposed on said image side of said second lens unit and having a negative refractive power;

a fourth lens unit having a positive refractive power and being disposed to an image side of said third lens unit; and a fifth lens unit having a positive refractive power and being disposed on an image side of said fourth lens unit;

wherein at least one of a first airspace reserved between said first lens unit and said second lens unit, and a second airspace reserved between said second lens unit and said third lens unit, is variable in axial length for zooming said zoom lens system.

6. A zoom lens system according to claim 5, satisfying the following conditions (1) and (2):

$$0.02 < |f_3/f_1| < 0.22 \quad (1)$$

$$0.20 < |f_3/f_4| < 0.42 \quad (2)$$

wherein the reference symbols $f_1$, $f_3$ and $f_4$ represent focal lengths of said first lens unit, said third lens unit and said fourth lens unit respectively.

* * * * *